(12) United States Patent
Iemura

(10) Patent No.: US 7,031,399 B2
(45) Date of Patent: *Apr. 18, 2006

(54) DEMODULATOR HAVING AUTOMATIC QUADRATURE CONTROL FUNCTION

(75) Inventor: Takaya Iemura, Tokyo (JP)

(73) Assignee: NEC Corporation (JP)

( * ) Notice: Subject to any disclaimer, the term of this patent is extended or adjusted under 35 U.S.C. 154(b) by 846 days.

This patent is subject to a terminal disclaimer.

(21) Appl. No.: 09/769,922

(22) Filed: Jan. 25, 2001

(65) Prior Publication Data

US 2001/0009574 A1    Jul. 26, 2001

(30) Foreign Application Priority Data

Jan. 25, 2000   (JP) .......................................... 2000-017069

(51) Int. Cl.
   *H04L 27/38* (2006.01)

(52) U.S. Cl. ........................ 375/285; 375/324; 375/349; 329/304; 329/306

(58) Field of Classification Search ................. 375/261, 375/298, 322, 326, 344, 345, 346; 455/313–315, 455/317, 318, 323–324, 334, 337–341, 255–265, 455/296, 307–312, 115–116, 126; 329/304, 329/306, 307, 308, 347, 350
See application file for complete search history.

(56) References Cited

U.S. PATENT DOCUMENTS

| | | | |
|---|---|---|---|
| 4,864,244 A | | 9/1989 | Sasaki |
| 5,138,272 A | * | 8/1992 | Le Polozec et al. ........ 329/304 |
| 6,009,317 A | | 12/1999 | Wynn |
| 6,044,112 A | | 3/2000 | Koslov |
| 6,310,513 B1 | * | 10/2001 | Iemura ........................ 329/304 |
| 6,535,560 B1 | * | 3/2003 | Masenten ................... 375/261 |
| 6,661,852 B1 | * | 12/2003 | Genrich ...................... 375/326 |

FOREIGN PATENT DOCUMENTS

| | | |
|---|---|---|
| JP | 1-317010 | 12/1989 |
| JP | 6-14068 | 1/1994 |
| JP | 6-85864 | 3/1994 |
| JP | 6-152676 | 5/1994 |
| JP | 6-188928 | 7/1994 |
| JP | 6-205067 | 7/1994 |

(Continued)

OTHER PUBLICATIONS

Japanese Office Action dated Jul. 30, 2002 (w/ English translation of relevant portion).
European Search Report dated Nov. 20, 2003.

*Primary Examiner*—Amanda T. Le
(74) *Attorney, Agent, or Firm*—Dickstein, Shapiro, Morin & Oshinsky, LLP

(57) ABSTRACT

A demodulator for automatically performing quadrature control in which there is no necessity for the modulator side to perform precision adjustment and deterioration in characteristics e.g., error rate is suppressed for long. The demodulator includes a quadrature controller fed with an in-phase component and a quadrature component output from the quadrature detecting unit to correct quadrature error between phases of in-phase and quadrature signals based on a quadrature error signal, an automatic gain controller AGC outputting in-phase and quadrature components of a demodulated signal corrected for amplitude errors by an amplitude error signal, an error detection unit fed with in-phase and quadrature components of the demodulated signal to output in-phase and quadrature components and polarity signals, an amplitude error detector outputting in-phase and quadrature components of the amplitude error to the AGC based on the in-phase and quadrature components and the respective polarity signals, and a quadrature error detection unit generating a quadrature error signal Qd based on the in-phase and quadrature components and the polarity signals to output the generated quadrature error signal to the quadrature controller.

9 Claims, 11 Drawing Sheets

FOREIGN PATENT DOCUMENTS

| | | |
|---|---|---|
| JP | 7-177188 | 7/1995 |
| JP | 9-247228 | 9/1997 |
| JP | 10-41992 | 2/1998 |
| JP | 11-088456 | 3/1999 |
| JP | 2000-216839 | 8/2000 |
| JP | 2000-244592 | 9/2000 |

* cited by examiner

US 7,031,399 B2

DEMODULATOR HAVING AUTOMATIC QUADRATURE CONTROL FUNCTION

FIELD OF THE INVENTION

This invention relates to a demodulator and, more particularly, to a demodulator for automatically correcting errors in a detection signal of a quadrature detected modulated signal in a digital radio communication system.

BACKGROUND OF THE INVENTION

FIG. 11 shows a typical structure of a conventional demodulator. Referring to FIG. 11, this demodulator includes a quadrature detecting unit 1, an automatic amplitude controller (AGC) 3, an error detection unit 3 and an amplitude error detection unit 4.

An input modulated signal is assumed to have been modulated in accordance with a quadrature modulation system, such as QPSK (quadrature phase shift keying) or QAM (quadrature amplitude modulation). The respective quadrature components (channels) are termed an in-phase component or channel (Ich) and a quadrature component or channel (Qch), respectively. A quadrature detecting unit 1 receives a quadrature modulated signal, as an IF (intermediate frequency) signal, and outputs an output signal as baseband signals Ich1 and Ich2. Meanwhile, the quadrature detecting unit 1 is made up of a known detection circuit, such as a synchronous detector, a semi-synchronous detector, or a delay detector.

The AGC 2 is fed with Ich2 and Qch2 and, using amplitude error signals Ai, Aq, fed from the amplitude error detection unit 4, corrects the amplitude errors to output signals Ich3, Qch3 each having a regular amplitude.

The error detection unit 3 uses (receives) Ich3, Qch3, output from the AGC 2, to output error signals Ei, Eq and polarity signals Di, Dq.

The amplitude error detection unit 4 uses the signals Ei, Eq, Di and Dq, output by the error detection unit 3, to output Ai and Aq as respective amplitude error signals of Ich and Qch.

SUMMARY OF THE DISCLOSURE

However, there is much to be desired in the art and various problems have been encountered in the course of the investigations toward the present invention. That is, it is not possible with the conventional demodulator shown in FIG. 11 to correct quadrature deviation produced in modulation.

Recently, an analog IC devices, termed quadrature modulators, are manufactured and marketed, such that there is now commercially available such a device automatically performing quadrature adjustment of the modulator. However, this device cannot be said to be of high precision. In particular, the device cannot be said to cope with multi-value modulation system, such as QAM, such that, if this device is put to practical use, the BER (bit error rate) tends to be lowered. Ultimately, the quadrature deviation in a modulator in the multi-valued modulation system has to be adjusted mainly by manual operations.

As described above, it is not possible in the conventional demodulators to correct the quadrature deviation produced at the time of modulation.

It was necessary to make manual analog adjustment except if an analog quadrature modulator can be applied. So, a quadrature adjustment process was required during device production etc., thus necessitating redundant time and operating steps.

Moreover, the demodulation circuit, adjusted manually in an analog fashion, is liable to degradation due to temperature or humidity of the analog components, while being liable to deterioration with lapse of time, resulting in that quadrature properties cannot be maintained for prolonged time.

Thus, if quadrature errors are produced on the modulator side, correction is not possible with the conventional demodulator so that demodulated signals (playback signals) such as shown in FIG. 8 are produced, thus naturally deteriorating the characteristics such as error rate.

In view of the above-described status of the art, it is an object of the present invention to provide a demodulator which, by performing automatic correction of quadrature errors in a digital fashion.

It is another object of the present invention, to provide a demodulator which renders it unnecessary to make precision adjustment on the modulator side and which assures operational stability and high reliability without producing deterioration in characteristics such as error rate for a prolonged time.

Further objects of the present invention will become apparent in the entire disclosure.

According to an aspect of the present invention there is provided a demodulator which comprises;

a quadrature controller for correcting quadrature errors of a signal quadrature-detected by a quadrature detecting unit, and a quadrature error detection unit for detecting a quadrature error based on an error signal detected as to in-phase and quadrature components from a demodulated signal output from an automatic gain controller fed with an input signal corrected for quadrature errors as an output signal of the quadrature controller, to feed the detected quadrature error (signal) to the quadrature controller.

According to a second aspect of the present invention, there is provided a demodulator which comprises;

(a) a quadrature detecting unit fed with and quadrature-detecting a quadrature modulated signal to output an in-phase component and a quadrature component;

(b) a quadrature controller fed with the in-phase component and the quadrature component output from the quadrature detecting unit, the quadrature controller correcting a quadrature error between the in-phase component and the quadrature component based on an input quadrature error signal, and outputting the resulting signal;

(c) an automatic gain controller fed with the in-phase component and the quadrature component output from the quadrature controller and outputting signals corrected for amplitude errors based on the input amplitude error signal as the in-phase component and the quadrature component of a demodulated signal;

(d) an error detection unit detecting, from the in-phase component and the quadrature component of the demodulated signal output from the automatic gain controller, an in-phase component of the error signal and a polarity signal of the in-phase component of the demodulated signal, and a quadrature component of the error signal and a polarity signal of the quadrature component of the demodulated signal;

(e) an amplitude error detection unit generating an in-phase component and a quadrature component of an amplitude error signal based on the in-phase component of the error signal output from the error detection unit and the polarity signal of the in-phase component of the demodulated signal, and on the quadrature component of the error signal and the polarity signal of the quadrature component of the demodulated signal, to output the generated in-phase and quadrature components of the amplitude error signal to the automatic gain controller; and (f) a quadrature error detect ion unit generating a quadrature error signal based on the in-phase component of the error signal and the polarity signal of the in-phase component of the demodulated signal, both output from the error detection unit, and on the in-phase component of the error signal and the polarity signal of the quadrature component of the demodulated signal to feed the generated quadrature error signal to the quadrature controller.

According to a third aspect of the present invention there is provided a demodulator which comprises;

(a) a quadrature detecting unit fed with a quadrature modulated signal as an input signal to quadrature-detect the input signal to output in-phase and quadrature components of a regular amplitude;

(b) a quadrature controller fed with the in-phase and quadrature components output from the quadrature detection unit to correct the quadrature error between phases of the in-phase and quadrature components, based on a quadrature error signal;

(c) an automatic gain controller fed with the in-phase and quadrature components output from the quadrature controller to output signals corrected for respective amplitude errors as in-phase and quadrature components of a demodulated signal;

(d) an error detection unit detecting an in-phase component of an error signal and a polarity signal of the in-phase component of the demodulated signal, and a quadrature component of the error signal and a polarity signal of the quadrature component of the demodulated signal, from the in-phase and quadrature components of the demodulated signal output from the automatic gain controller; and (e) a quadrature error detection unit generating a quadrature error signal based on the in-phase component of the error signal and the polarity signal of the in-phase component of the demodulated signal, and the quadrature component of the error signal and a polarity signal of the quadrature component of the demodulated signal, all output from the error detection unit, to feed the generated quadrature error signal to the quadrature controller.

Further aspects of the present invention are disclosed in the claims, particularly in the dependent claims.

In a fourth aspect, the quadrature controller comprises;

a first low-pass filter fed with the quadrature error signal output from the quadrature error detection unit to smooth out and output the quadrature error signal;

a first multiplier multiplying the quadrature component output from the quadrature detecting unit with an output of the first low-pass filter; and a first adder adding the in-phase component output from the quadrature detecting unit and an output of the first multiplier;

the quadrature component output from the quadrature detecting unit being directly output, an output of the first adder being output as an in-phase component corrected for quadrature errors.

In a fifth aspect, the quadrature error detection unit comprises;

a second multiplier multiplying the in-phase component of the error signal (Ei) output from the quadrature detecting unit with the polarity signal (Dq) of the quadrature component of the demodulated signal;

a third multiplier multiplying the quadrature component of the error signal (Eq) output from the quadrature detecting unit with the polarity signal (Di) of the in-phase component of the demodulated signal; and a second adder summing outputs of the second and third multipliers;

an output signal of the second adder being output as the quadrature error signal (Qd).

In a sixth aspect, the automatic gain controller comprises;

a second low-pass filter smoothing out and outputting the in-phase component of the amplitude error signal output from the amplitude error detection unit;

a third low-pass filter smoothing out and outputting the quadrature component of the amplitude error signal output from the amplitude error detection unit;

a fourth multiplier multiplying the in-phase component output from the quadrature controller as an input signal with an in-phase component of the amplitude error signal smoothed out by the second low-pass filter, the fourth multiplier outputting the result of multiplication as the in-phase component of the demodulated signal; and a fifth multiplier multiplying the quadrature component output from the quadrature controller as an input signal with a quadrature component of the amplitude error signal smoothed out by the third low-pass filter, the fifth multiplier outputting the result of multiplication as the quadrature component of the demodulated signal.

In a seventh aspect, the automatic gain controller comprises;

a first absolute value computing circuit determining an absolute value of the in-phase component output from the quadrature controller;

a second absolute value computing circuit determining an absolute value of the quadrature component output from the quadrature controller;

a third adder adding together outputs from the first and second absolute value computing circuit;

a fourth low pass filter smoothing out an output of the third adder;

a sixth multiplier multiplying an in-phase component output from the quadrature controller with an output of the fourth low pass filter; and wherein the quadrature component output from the quadrature controller is directly output as the quadrature component, and an output of the sixth multiplier is output as the in-phase component of the demodulated signal.

PREFERRED EMBODIMENTS OF THE INVENTION

Figure 1:
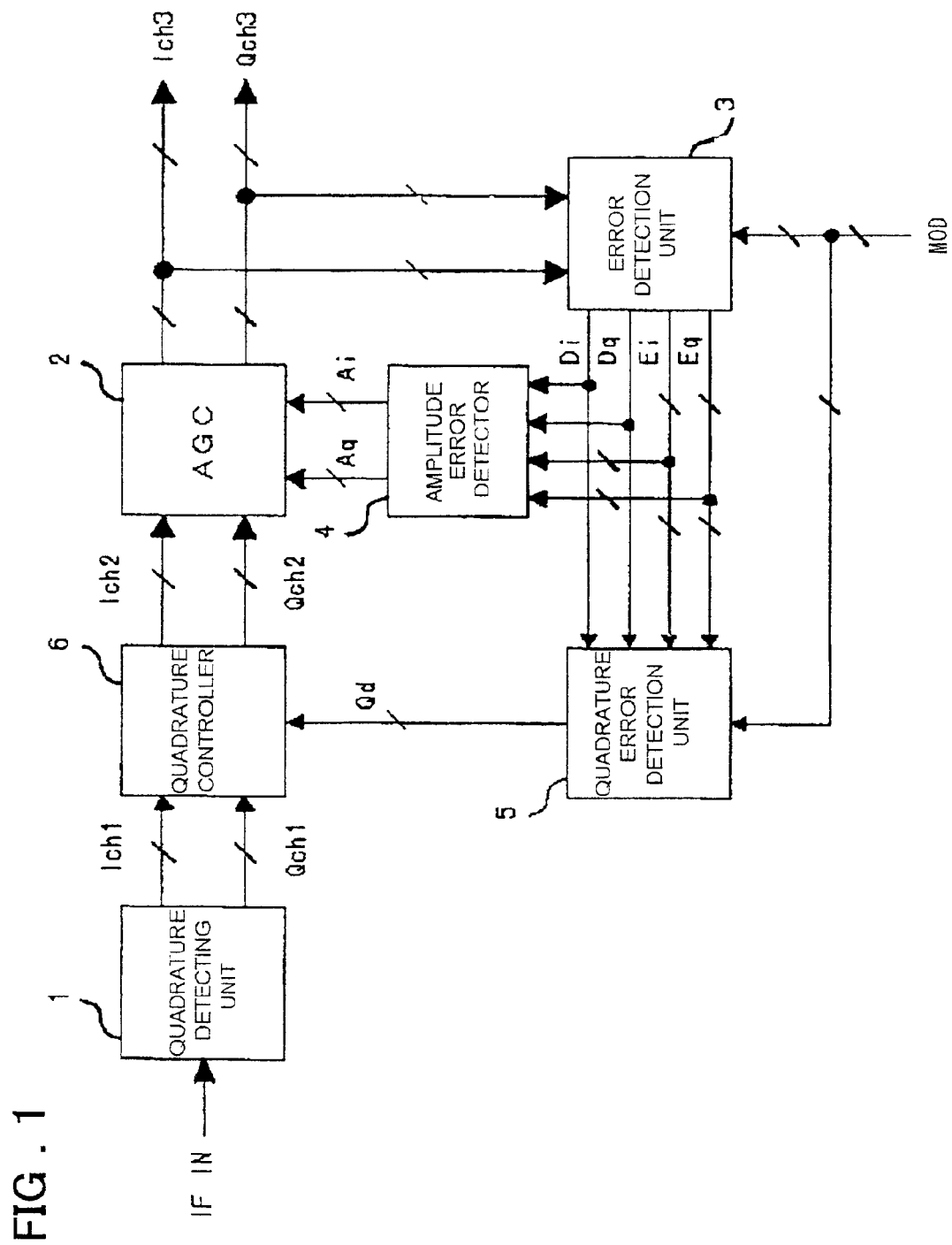
FIG. 1 shows a structure of an embodiment of the present invention.

A preferred embodiment of the present invention is now explained. Referring to FIG. 1, a preferred embodiment of the demodulator of the present invention includes a quadrature detecting unit 1, a quadrature controller 6, and an automatic amplitude controller (AGC) 2 in this order of signal flow, and further a feed back circuitry comprising an error detection unit 3, an amplitude error detection unit 4 and quadrature error detection unit 5. The quadrature detecting unit 1 is fed as an input signal with an intermediate frequency (IF IN) signal for quadrature-detecting the input signal to output an in-phase component Ich1 and a quadrature component Qch1. The quadrature controller 6 is fed with an in-phase component and a quadrature component output from the quadrature detecting unit 1 to correct the quadrature error based on quadrature error signal Qd. The automatic gain controller AGC 2 is fed with the in-phase and quadrature components Ich2, Qch2 output from the quadrature controller 6 to output signals, which are corrected for respective amplitude errors by in-phase and quadrature components Ai, Aq of the amplitude error, as in phase and quadrature components Ich3, Qch3 of the demodulated signal. The error detection unit 3 is fed with the in-phase and quadrature components Ich2, Qch3 of the demodulated signal output from the automatic gain controller 2, and detects and outputs an in-phase component and a polarity signal Ei, Di of the error signal and a quadrature component and a polarity signal Eq, Dq of the error signal. The amplitude error detection unit 4 outputs an in-phase component and a quadrature component Ai, Aq of the amplitude error to the automatic gain controller 2 based on a polarity signal Di of the in-phase component Ich3 of the demodulated signal and the in-phase component Ei of the error signal, and on a polarity signal Dq of the quadrature component Qch3 of the demodulated signal and the quadrature component Eq of the error signal, Di, Dq, Ei and Eq being output by the error detection unit 3. The quadrature error detection unit 5 generates a quadrature error signal Qd based on an in-phase component Ei and a polarity signal Di of the error signal and a quadrature component Eq and polarity signal Dq of the error signal, Ei, Di, Eq and Dq being output from the error detection unit 3, and outputs the quadrature error signal Qd to the quadrature controller 6. The quadrature error between phases of the in-phase component Ich and the quadrature component Qch generated at the time of modulation is corrected by the quadrature controller 6.

Figure 7:
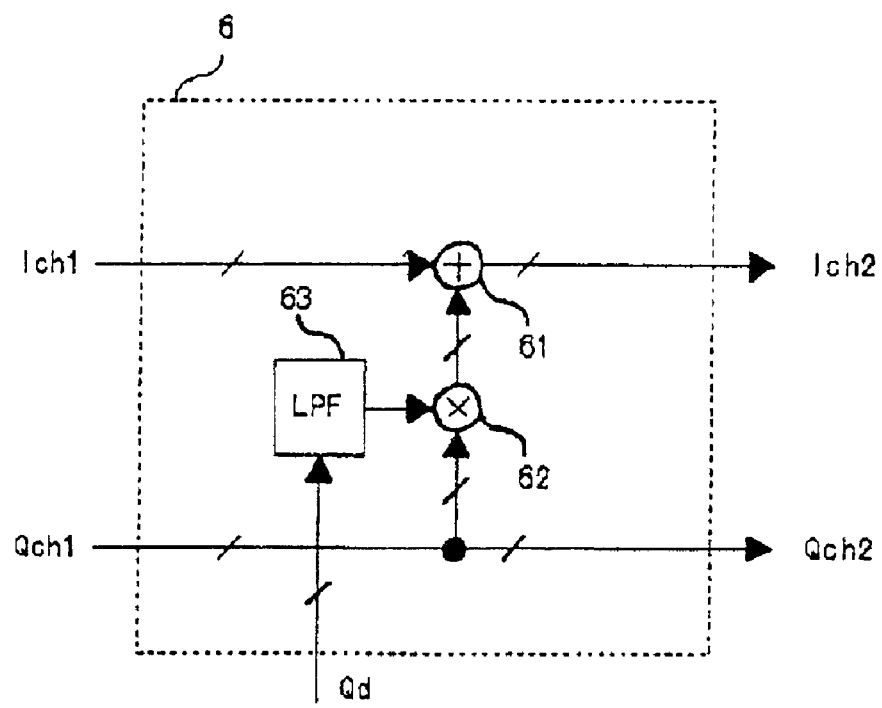
FIG. 7 shows a structure of quadrature controller according to an embodiment of the present invention.

Referring to FIG. 7, the quadrature controller 6 includes a first low-pass filter 63 for smoothing the quadrature error signal Qd output from the quadrature error detection unit, a first multiplier 62 for multiplying the quadrature component Qch1 output from the quadrature detecting unit with an output of the first low-pass filter 63, and a first adder 61 for adding the in-phase component Ich1 output from the quadrature detecting unit and an output of the first multiplier 62. The quadrature component output from the quadrature detecting unit is directly output as Qch2, an output of the first adder 61 being output as an in-phase component Ich2 corrected for quadrature errors.

Figure 6:
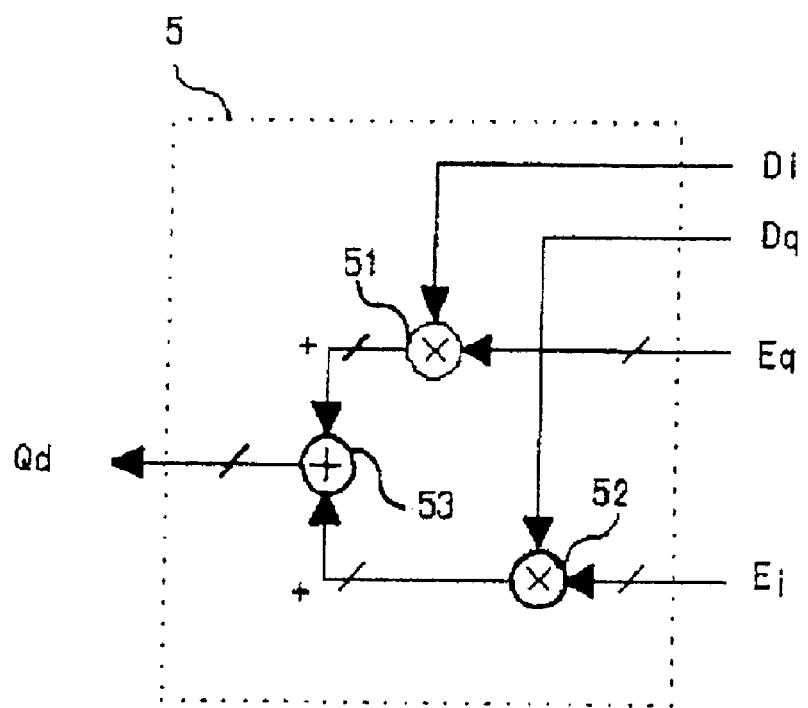
FIG. 6 shows a structure of quadrature error detection unit according to an embodiment of the present invention.

Referring to FIG. 6, the quadrature error detection unit 5 includes a second multiplier 51 for multiplying an in-phase component of an error signal (Ei) output from the error detection unit 3 with a polarity signal Dq of a quadrature component Qch3 of the demodulated signal, a third multiplier 52 for multiplying a quadrature component Eq of the error signal output from the error detecting unit 3 with a polarity signal Di of the in-phase component Ich3 of the demodulated signal, and a second adder 53 for summing outputs of the second and third adders 51, 52, wherein an output of the second adder 53 is output as a quadrature error signal (Qd).

Figure 2:
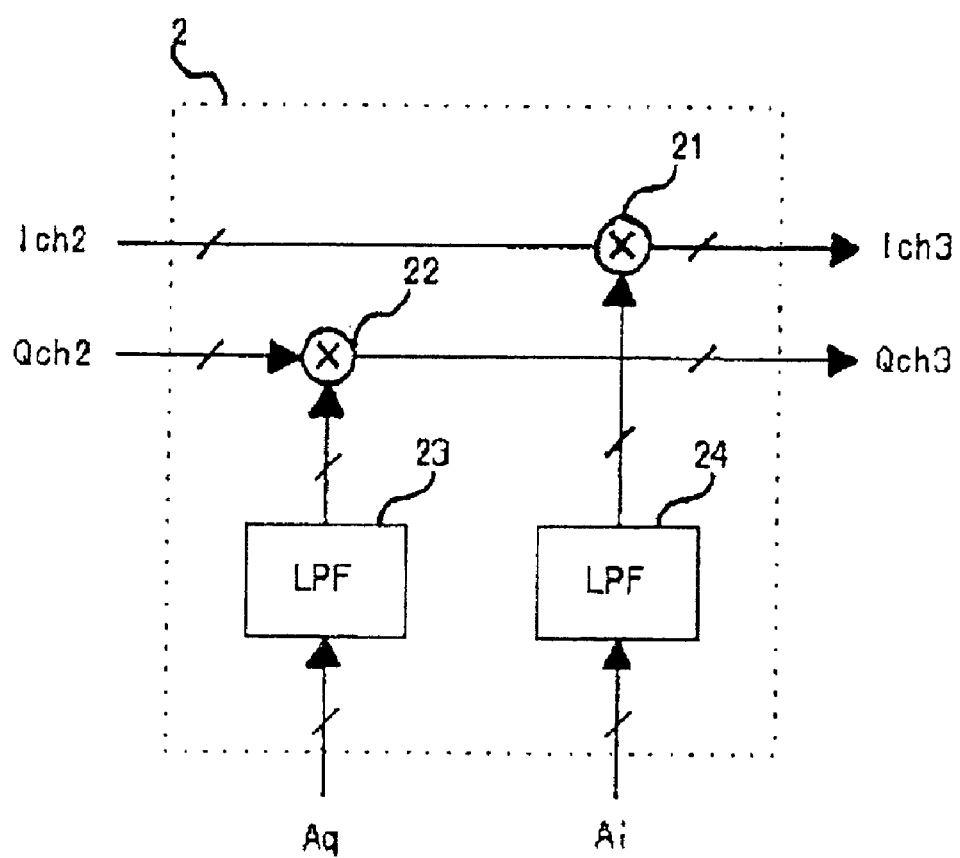
FIG. 2 shows a structure of an AGC according to an embodiment of the present invention.

Referring to FIG. 2, the automatic gain controller 2 includes a second low-pass filter 24 for smoothing out an in-phase component Ai of an amplitude error signal output from the amplitude error detection unit 4; a third low-pass filter 23 for smoothing out a quadrature component Aq of the amplitude error signal output from the amplitude error detection unit 4; a fourth multiplier 21 for multiplying the in-phase component Ich2 output from the quadrature controller 6 with an in-phase component Ai of the amplitude error signal smoothed out by the second low-pass filter 24 for outputting the result of multiplication as an in-phase component Ich3 of the demodulated signal; and a fifth multiplier 22 for multiplying the quadrature component Qch2 output from the quadrature controller 6 with a quadrature component Aq of the amplitude error signal smoothed out by the third low-pass filter 23 for outputting the result of multiplication as a demodulated quadrature signal Qch3.

Figure 9:
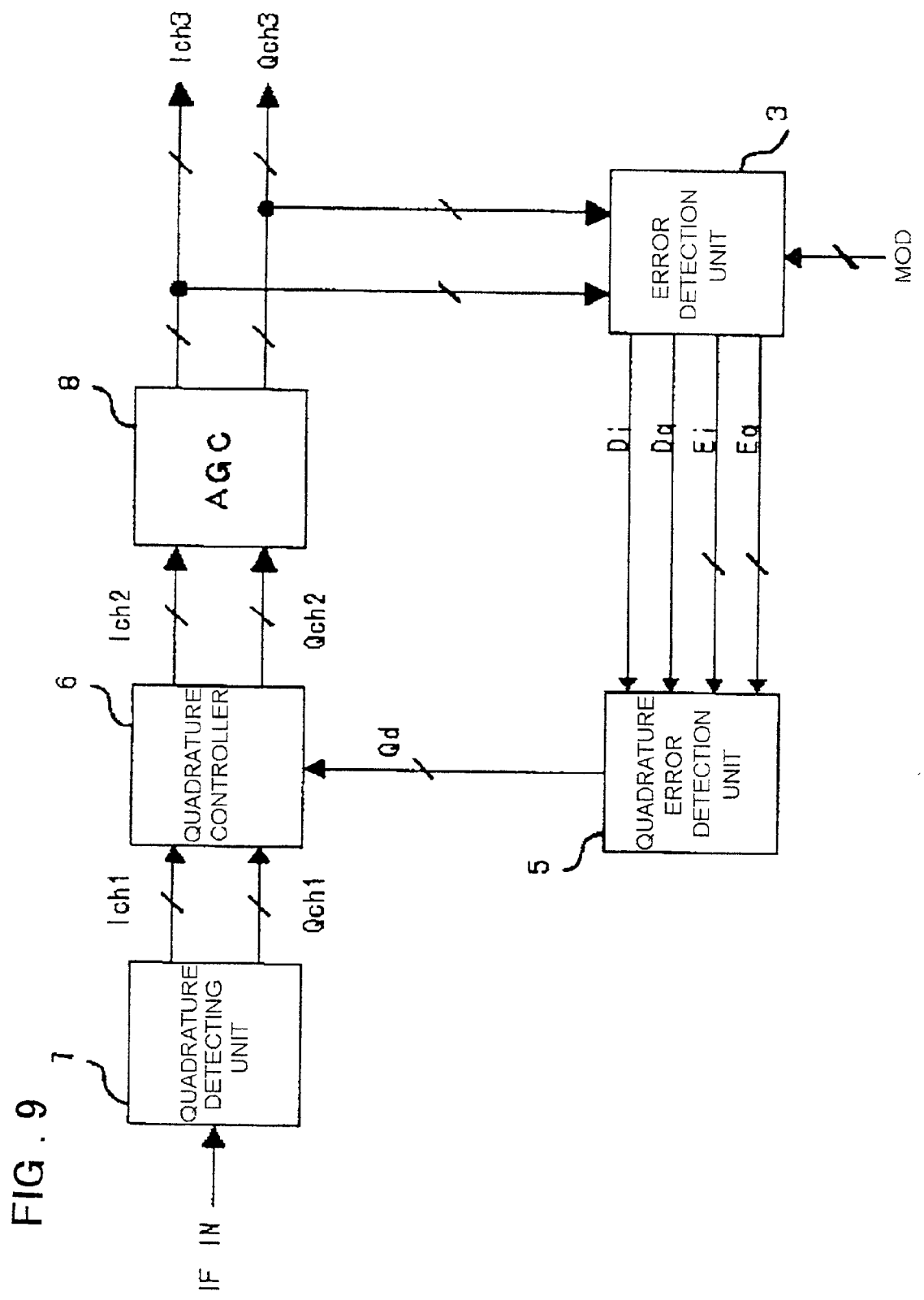
FIG. 9 shows a modified embodiment of the present invention.

In a preferred embodiment, shown in FIG. 9, the demodulator of the present invention includes quadrature detecting unit 7 fed as an input signal with an intermediate frequency signal IF IN for quadrature-detecting the input signal to output an in-phase component Ich1 and a quadrature component Qch1; a quadrature controller 6 fed with the in-phase and quadrature components output from the quadrature detecting unit 1 to correct the quadrature error based on quadrature error signal Qd; an automatic gain controller 8 fed with the in-phase and quadrature components Ich2, Qch2 output from the quadrature controller 6 to output signals corrected for respective amplitude errors as in-phase and quadrature components Ich3, Qch3 of a demodulated signal; an error detection unit 3 fed with the in-phase and quadrature components of the demodulated signal output from the automatic gain controller 8 to detect and output an in-phase component and its polarity signal (Ei, Di) of the error signal and a quadrature component and its polarity signal (Eq, Dq) of the error signal; and a quadrature error detection unit 5 for generating a quadrature error signal Qd based on an in-phase component Ei and its polarity signal Di of the error signal output from the error detect ion unit 3 and on a quadrature component Eq and its polarity signal Dq of the error signal to output the quadrature error signal Qd to the quadrature controller 6.

Figure 10:
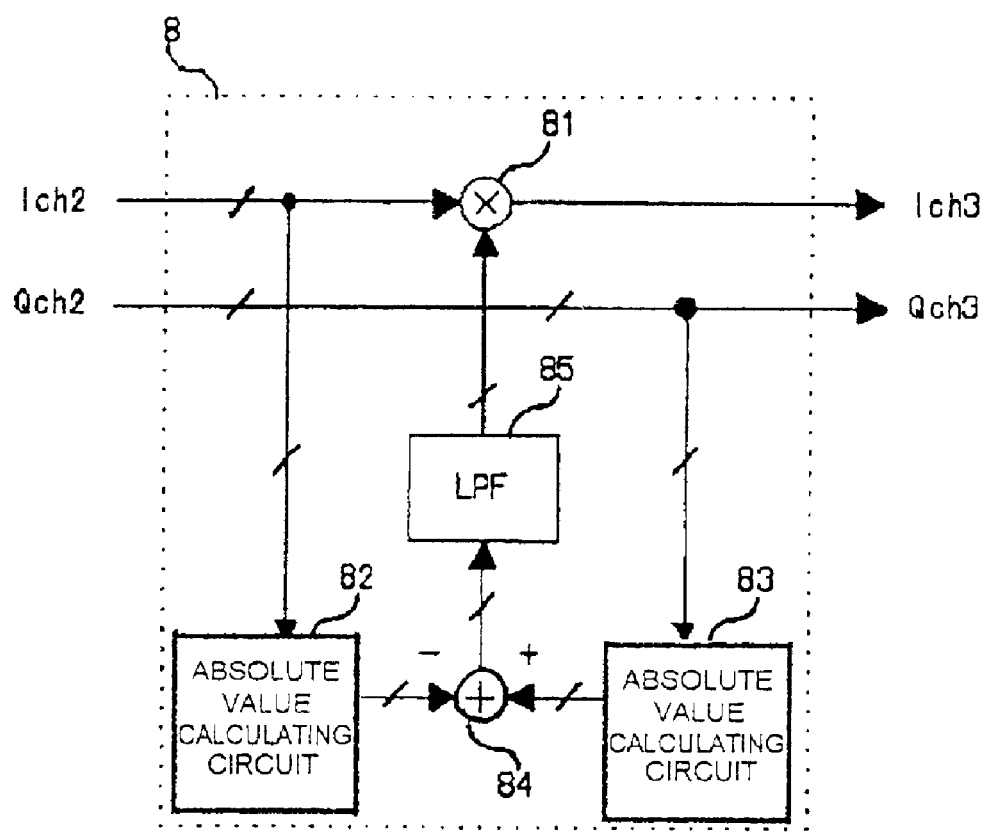
FIG. 10 shows a structure of an AGC according to the modified embodiment of the present invention.

Referring to FIG. 10, the automatic gain controller 8 includes a first absolute value computing circuit 82 for determining an absolute value of an in-phase component output from the quadrature controller; a second absolute value computing circuit 83 for calculating an absolute value of a quadrature component Qch2 output from the quadrature controller 6; an adder 84 for summing an output value of the second absolute value computing circuit 83 with an output value of the first absolute value computing circuit 82; a fourth low-pass filter 85 for smoothing an output of the adder 84; and a sixth multiplier 81 for multiplying the in-phase component Ich2 output from the quadrature controller with an output of the fourth low-pass filter 85. An output Qch2 of quadrature controller 6 is output directly as a quadrature component Qch3 of the demodulated signal, while an output of the sixth multiplier 81 is output as an in-phase component Ich3 of the demodulated signal.

[Preferred Embodiments]

For further explaining the preferred embodiments of the present invention, an example of the present invention is explained with reference to the drawings.

FIG. 1 shows a configuration of an embodiment of a demodulator of the present invention. Referring to FIG. 1, an embodiment of the present invention includes a quadrature detecting unit 1, an AGC 2, an error detection unit 3, an amplitude error detection unit 4, a quadrature error detection unit 5, and a quadrature controller 6. It is assumed that the input modulation signal has been modulated in accordance with the quadrature modulation system, such as QPSK or QAM. For each of the quadrature components (channels), appellations of in-phase component (channel, Ich) and quadrature component (channel, Qch) are used.

The quadrature-detecting unit 1 demodulates input quadrature modulated signals, as IF (intermediate frequency) signals, into baseband signals Ich1 and Qch1. Meanwhile, the quadrature-detecting unit 1 is made up of known detection circuits, such as a synchronous detection circuit, a sub (or quasi)-synchronous circuit and/or a delay detection circuit.

The quadrature controller 6 is fed with baseband signals Ich1, Qch1, output by the quadrature detecting unit 1, to output signals Ich2, Qch2, freed of quadrature errors, using a quadrature error signal Qd input from the quadrature error detection unit 5.

The AGC 2 is fed with Ich2, Qch2 to output Ich3, Qch3, having regular (or normal) amplitudes, using amplitude error signals Ai, Aq input from the amplitude error detection unit 4.

The error detection unit 3 outputs error signals Ei, Eq and polarity signals Di, Dq, using Ich3, Qch3, output from the AGC 2.

The amplitude error detection unit 4 outputs amplitude error signals Ai, Aq of Ich and Qch, respectively, using the outputs Ei, Eq, Di, Dq output by the error detection unit 3.

The quadrature error detection unit 5 outputs the quadrature error signal Qd, using the outputs Ei, Eq, Di, Dq supplied from the error detection unit 3.

Referring to the drawings, the structure of respective elements of the demodulator are hereinafter explained.

FIG. 2 shows an illustrative structure of the AGC 2. Referring to FIG. 2, the AGC 2 is made up of multipliers 21, 22 and low-pass filters (LPFs) 23, 24. The AGC 2 performs amplitude control so that the signals Ich2, Qch2 output by the quadrature controller 6 will be at regular signal point positions, using the amplitude error signals Ai, Aq, output by the amplitude error detection unit 4, to produce modulated signals Ich3, Qch3.

Figure 3:
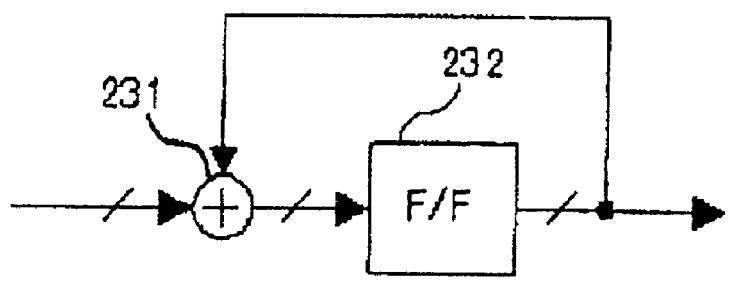
FIG. 3 shows a structure of an LPF according to an embodiment of the present invention.

FIG. 3 shows an illustrative structure of the LPFs 23, 24 of the AGC 2 and an LPF 63 contained in the quadrature controller 6. Referring to FIG. 3, the LPF is comprised of an integrator made up of a flip-flop 232 operating as a delay element and an adder 231. That is, the current signal and a signal delayed by one clock by the flip-flop 23 are summed together by the adder 231 and latched and output by the flip-flop 232.

Figure 4:
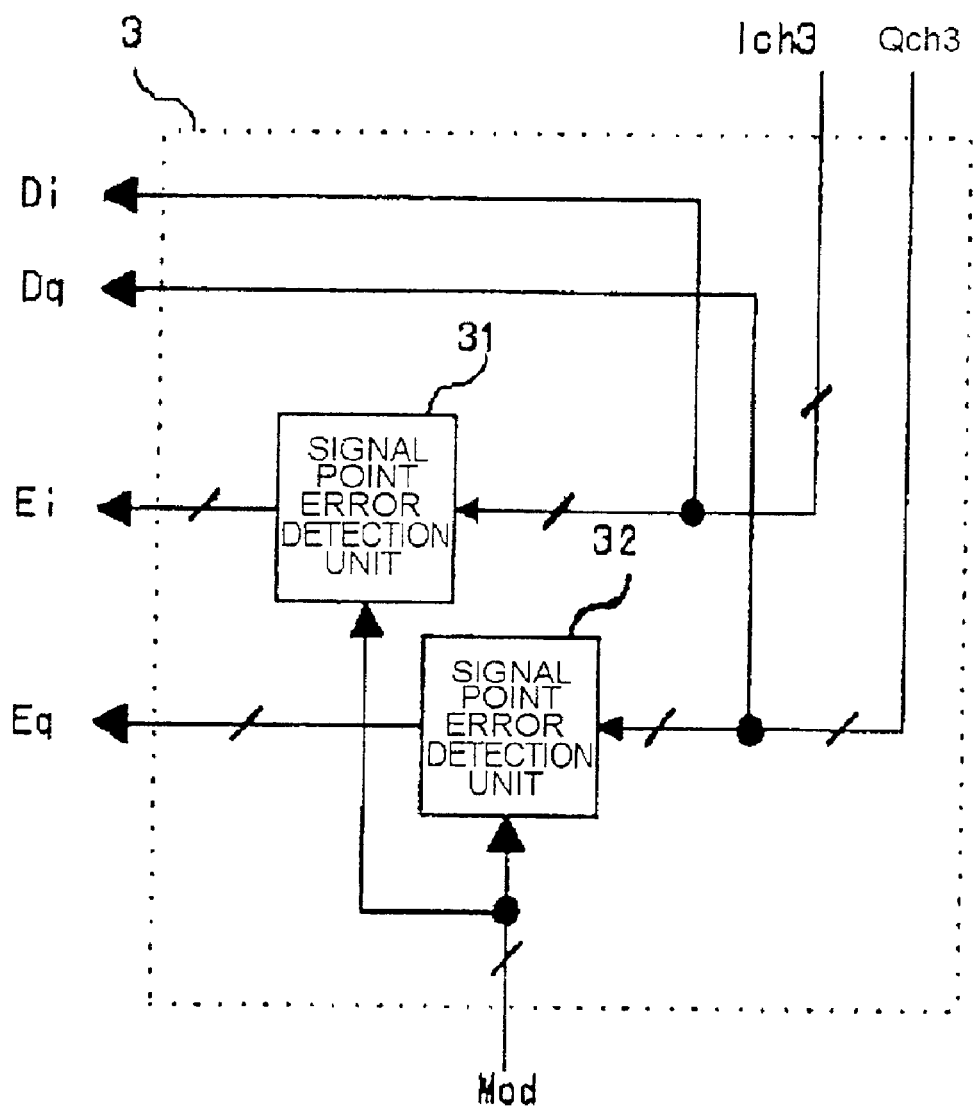
FIG. 4 shows a structure of an error detection unit according to an embodiment of the present invention.

FIG. 4 shows an illustrative structure of the error detection unit 3. Referring to FIG. 4, the error detection unit 1 is made up of signal point error detection units 31, 32. The signal point error detection units 31, 32 detect errors (deviations) from the regular signal point positions of the input signals Ich3, Qch3 to output error (deviation) signals Ei Eq.

If the input signals Ich3, Qch3 are deviated in the positive or negative direction from the regular signal point positions, the output error signals Ei, Eq assume negative and positive values, respectively. Since the regular signal point positions vary with modulation systems used, a signal MOD specifying the modulation system is supplied to the signal point error detection units 31, 32. The polarity signals Di, Dq represent polarities of the signal Ich3, Qch3, respectively, and are acquired from respective sign bits.

Figure 5:
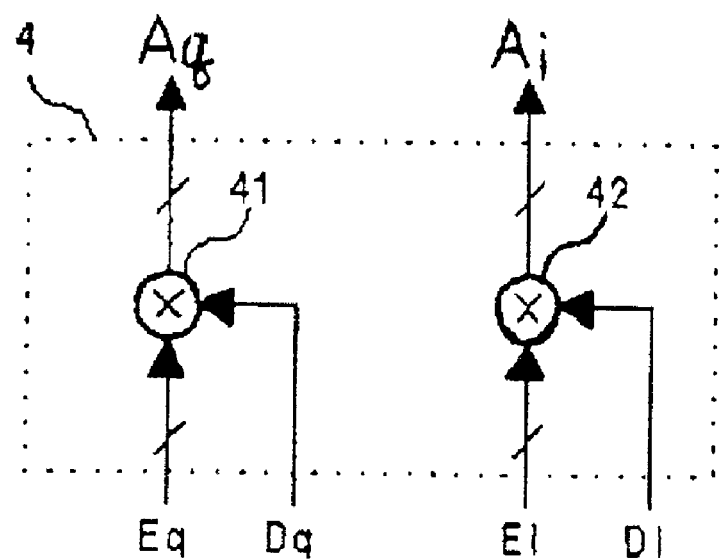
FIG. 5 shows a structure of an amplitude error detection unit according to an embodiment of the present invention.

FIG. 5 shows the structure of the amplitude error detection unit 4. Referring to FIG. 5, the amplitude error detection unit 4 includes a multiplier 42 for multiplying the in-phase component Ei of the error signal and its polarity signal Di to output the amplitude error signal Ai, and a multiplier 41 for multiplying the quadrature component Eq of the error signal and its polarity signal Dq to output an amplitude error signal Aq.

FIG. 6 shows the structure of the quadrature error detection unit 5. Referring to FIG. 6, the quadrature error detection unit 5 is made up of multipliers 51, 52 and an adder 53. The results of multiplication of Ei with Dq and those of Eq with Di in the multipliers 51, 52 are summed together in the adder 53 to give a quadrature error signal Qd (see the following equation (1)).

FIG. 7 shows the structure of the quadrature controller 6. Referring to FIG. 7, the quadrature controller 6 is made up of an adder 61, a multiplier 62 and a low pass filter LPF 63.

The quadrature error signal Qd, output from the quadrature error detection unit 5, is smoothed by the LPF 63, an output of which is multiplied by the multiplier 62 with Qch1. The resulting product is summed (added) in the adder 61 with Ich1 (Ich1 less the product obtained on multiplication) and the resulting sum is output as Ich2 to correct the quadrature error. The output Qch2 on the Qch side is no other than Qch1.

The operation of an example of the present invention is explained mainly with reference to the quadrature controller 6.

The signal point error signals Ei, Eq, obtained by the error detection unit 3, and the polarity signals Di, Dq, indicate whether the reproduced signal is deviated from the regular signal point position in the positive direction or in the negative direction. For quadrature control, these signals need to be converted into quadrature error (deviation) signals.

Figure 8:
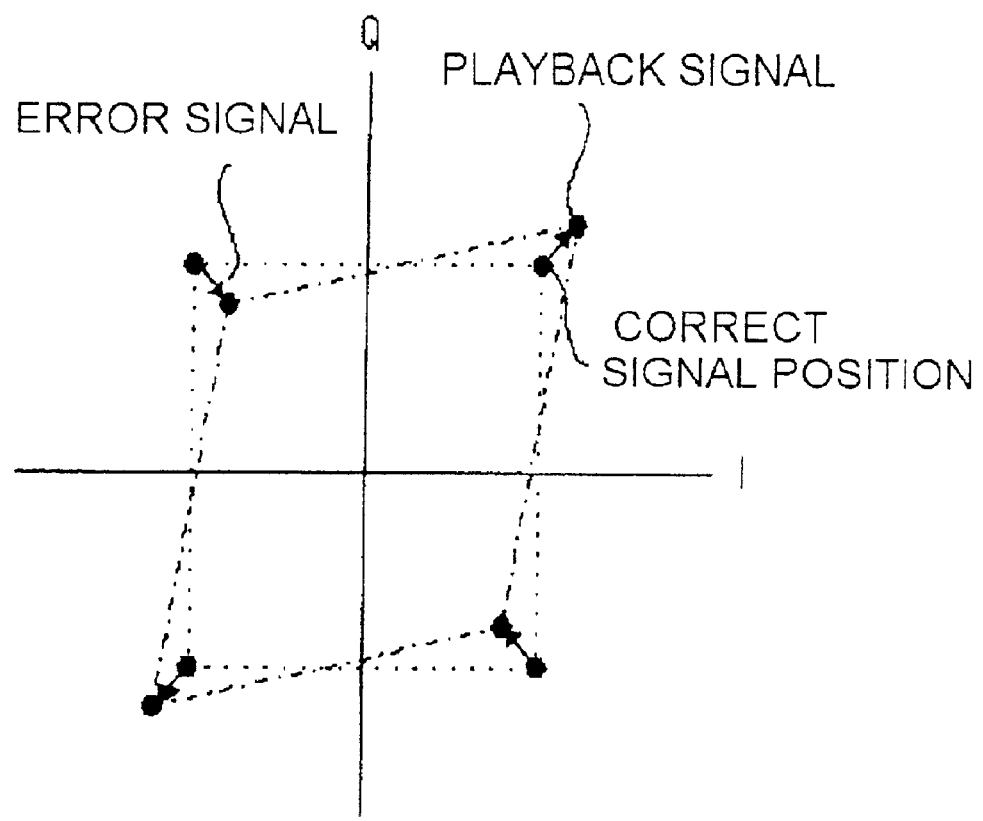
FIG. 8 is a graph showing demodulated signals on occurrence of quadrature deviation in QPSK modulation on an I-Q complex plane.

FIG. 8 shows on an I-Q complex plane the modulated signal in case of occurrence of a quadrature deviation. It is seen from FIG. 8 that, since the distances between respective signal points and the point of origin are inherently equal to each other, the signal points should be positioned on apex points of a square. However, these signal points are actually positioned on apex points of a diamond shape. In order to correct this state, such error signals, which will correct the deviation in the diagonal directions from the regular signal points, as shown in FIG. 8, are required.

For obtaining these error signals, it is only sufficient if the quadrature error signals Qd, represented by the following equation (1):

$$Qd = Ei \cdot Dq + Eq \cdot Di \qquad (1)$$

is used.

The quadrature error detection unit 5 generates this Qd.

The quadrature error control based on quadrature error signals is explained. Assume that the IF input signal to a quadrature detection unit 7 is A (t), an angular velocity of a local oscillator, not shown, in the quadrature detection unit 7, is ω rad/sec and a quadrature error is δ rad, the signals Ich, Qch input to an A/D (analog/digital) converter, not shown, supplying Ich1, Qch1 of digital signals to the quadrature controller 6, are given by the following equations (2) and (3):

$$Ich = A(t)\cos(\omega t + \delta) = A(t)\cos\omega t \cdot \cos\delta - A(t)\sin\omega t \cdot \sin\delta = A(t)\cos\omega t \cdot \cos\delta - Qch \cdot \sin\delta \quad (2)$$

$$Qch = A(t)\sin\omega t \quad (3).$$

For demodulating this signal regularly, δ in Ich of the above equation (2) needs to be eliminated. However, the term of $A(t)\cos\omega t \cdot \cos\delta$ represents merely a lowered gain of Ich and can be corrected by AGC2.

So, in the Ich of the above equation (2), it suffices if the term of $-Qch \cdot \sin\delta$ in Ich of the equation (2) is corrected.

Since δ may be regarded as a constant for a short period of time, the product of the quadrature error signal with the Qch value may be summed (added) to Ich to correct the quadrature error. In an embodiment of the present invention, the above-mentioned correction operation is performed in the quadrature controller 6 shown in FIG. 7.

A further embodiment of the present invention is now explained. FIG. 9 shows a second embodiment of the present invention. Referring to FIG. 9, the second embodiment of the present invention differs from the first embodiment shown in FIG. 1 as to the quadrature detecting unit 7 and the AGC 8.

In the above-described first embodiment, in which the AGC 2 corrects the amplitudes of Ich and Qch, it is unnecessary for the quadrature-detecting unit 1 to output a signal of the regular amplitude. On the other hand, in the second embodiment of the present invention, the quadrature detecting unit 7 outputs signals of the regular amplitude. So, it is unnecessary for the AGC 8 to perform the operation for causing the output signal to be on the regular amplitude, such that it is only necessary for the AGC 8 to correct the lowering of the gain of Ich that is not corrected by the quadrature controller 6.

Figure 11:
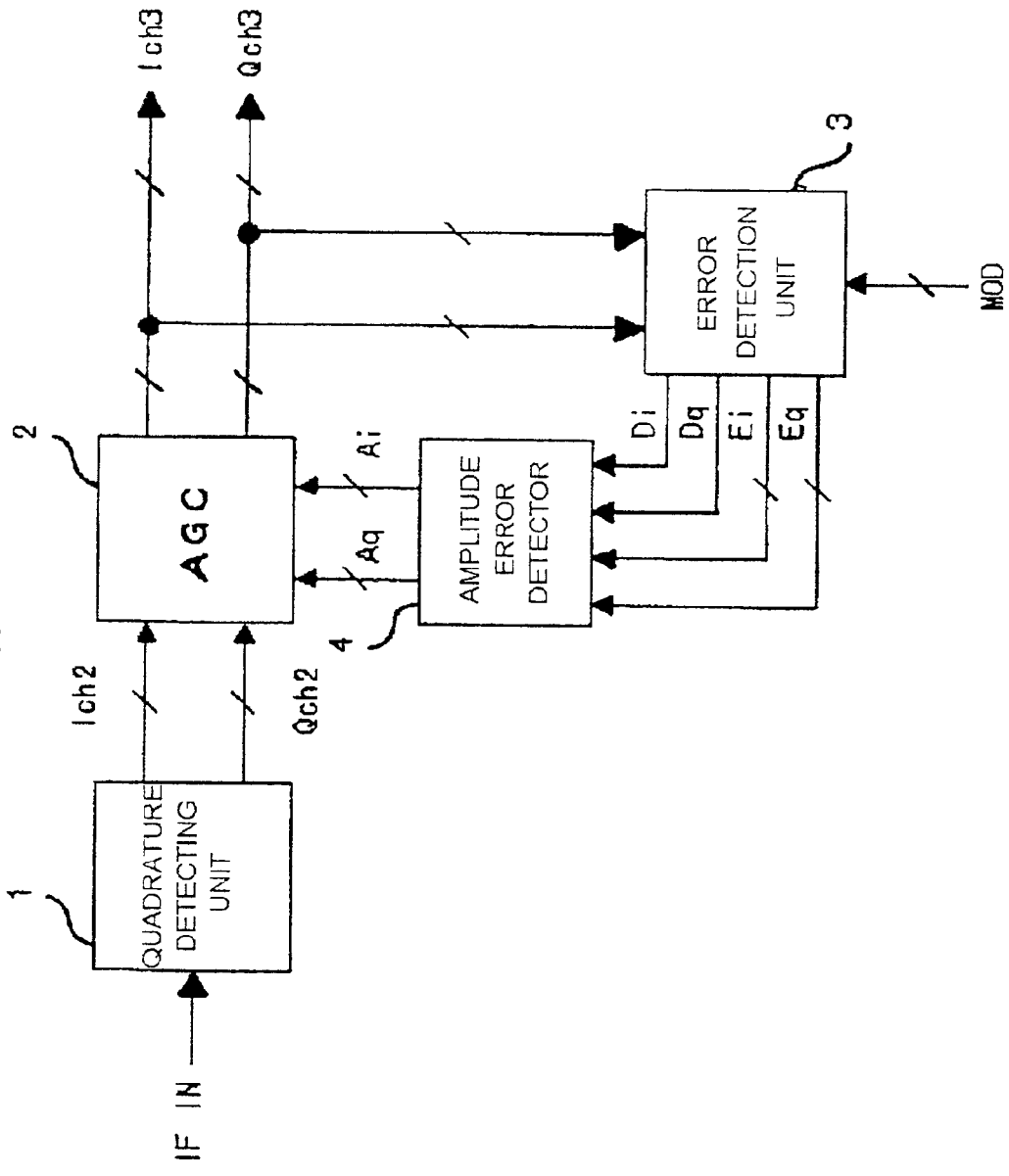
FIG. 11 shows a structure of a conventional demodulator.

FIG. 10 shows an illustrative structure of the AGC 8. Referring to FIG. 11, the AGC 8 is made up of a (sixth) multiplier 81, absolute value circuits (calculating units) 82, 83, an adder 84 and an (fourth) LPF 85. The absolute value circuits 82, 83 determine the amplitudes of Ich2 and Qch2 and a relative magnitude (difference) thereof by the adder 84 to obtain an amplitude error signal between Ich and Qch. It is noted that the adder 84 operates as a subtractor for outputting a difference value corresponding to the output value of the absolute value circuit 83 less the output value of the absolute value circuit 82. The amplitude error signal obtained by the adder 84 is smoothed by the LPF 85. The smoothed amplitude error signal is multiplied by the Ich by the multiplier 81. The resulting product is output as Ich3. The Qch2 from the quadrature controller 6 is directly output as Qch3 to correct the amplitude difference between Ich and Qch.

The meritorious effects of the present invention are summarized as follows.

The present invention provides a configuration comprising a quadrature controller correcting quadrature errors of a signal quadrature-detected by a quadrature detecting unit, and a quadrature error detecting unit detecting a quadrature error, wherein the quadrature errors are corrected based on an error signal detected as to in-phase and quadrature components of a demodulated signal output from an automatic gain controller fed as an input signal with an output signal of the quadrature controller, and the detected quadrature error Qd is fed to the quadrature controller. Therefore, it is unnecessary to make manual adjustment of analog circuit elements such that quadrature errors of the modulator can be eliminated fully digitally and automatically. Moreover, the present invention gives a meritorious effects that full digitization facilitates designing as LSI.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A demodulator comprising:
   (a) a quadrature controller fed with a signal quadrature-detected by a quadrature detecting unit as an input signal to correct a quadrature error between phases of an in-phase component and a quadrature component of said signal based on a quadrature error signal used for correcting said quadrature error to output a corrected signal;
   (b) an error detection unit detecting an error signal between the in-phase component and the quadrature component of a demodulated signal output by an automatic gain controller fed with an output signal of said quadrature controller corrected for quadrature error; and
   (c) a quadrature error detection unit detecting the quadrature error based on said error signal to feed the quadrature error signal to said quadrature controller.

2. A demodulator comprising:
   (a) a quadrature detecting unit fed with and quadrature-detecting a quadrature modulated signal to output an in-phase component and a quadrature component;
   (b) a quadrature controller fed with the in-phase component and the quadrature component output from said quadrature detecting unit, said quadrature controller correcting the quadrature error between the in-phase component and the quadrature component based on an input quadrature error signal, and outputting the resulting signal;
   (c) an automatic gain controller fed with the in-phase component and the quadrature component output from said quadrature controller and outputting signals corrected for amplitude errors based on the input amplitude error signal as the in-phase component and the quadrature component of a demodulated signal;
   (d) an error detection unit detecting, from the in-phase component and the quadrature component of the demodulated signal output from said automatic gain controller, an in-phase component of said error signal and a polarity signal of the in-phase component of the demodulated signal, and a quadrature component of the error signal and a polarity signal of the quadrature component of said demodulated signal;
   (e) an amplitude error detection unit generating an in-phase component and a quadrature component of an amplitude error signal based on the in-phase component of said error signal output from said error detection unit and the polarity signal of the in-phase component of the demodulated signal, and on the quadrature component of the error signal and the polarity signal of the quadrature component of said demodulated signal, to output the generated in-phase and quadrature components of said amplitude error signal to said automatic gain controller; and (f) a quadrature error detection unit generating a quadrature error signal based on the in-phase component of the error signal and the polarity signal of the in-phase component of said demodulated signal, both output from said error detection unit, and on the in-phase component of said error signal and the polarity signal of the quadrature component of said demodulated signal to feed the generated quadrature error signal to said quadrature controller.

3. A demodulator comprising:

(a) an quadrature detecting unit fed with a quadrature modulated signal as an input signal to quadrature-detect the input signal to output in-phase and quadrature components of a regular amplitude;

(b) a quadrature controller fed with the in-phase and quadrature components output from the quadrature detection unit to correct the quadrature error between phases of the in-phase and quadrature components, based a quadrature error signal;

(c) an automatic gain controller fed with the in-phase and quadrature components output from said quadrature controller to output signals corrected for respective amplitude errors as in-phase and quadrature components of a demodulated signal;

(d) an error detection unit detecting an in-phase component of an error signal and a polarity signal of the in-phase component of the demodulated signal, and a quadrature component of the error signal and a polarity signal of the quadrature component of the demodulated signal, from the in-phase and quadrature components of the demodulated signal output from the automatic gain controller; and (e) a quadrature error detection unit generating a quadrature error signal based on the in-phase component of the error signal and the polarity signal of the in-phase component of the demodulated signal, and the quadrature component of the error signal and a polarity signal of the quadrature component of the demodulated signal, all output from said error detection unit, to feed the generated quadrature error signal to said quadrature controller.

4. The demodulator as defined in claim 2 wherein said quadrature controller comprises:

a first low-pass filter fed with said quadrature error signal output from said quadrature error detection unit to smooth out and output said quadrature error signal;

a first multiplier multiplying the quadrature component output from said quadrature detecting unit with an output of said first low-pass filter;

and a first adder adding the in-phase component output from said quadrature detecting unit and an output of said first multiplier;

the quadrature component output from said quadrature detecting unit being directly output, an output of said first adder being output as an in-phase component corrected for quadrature errors.

5. The demodulator as defined in claim 3 wherein said quadrature controller comprises:

a first low-pass filter fed with said quadrature error signal output from said quadrature error detection unit to smooth out and output said quadrature error signal;

a first multiplier multiplying the quadrature component output from said quadrature detecting unit with an output of said first low-pass filter; and a first adder adding the in-phase component output from said quadrature detecting unit and an output of said first multiplier;

the quadrature component output from said quadrature detecting unit being directly output, an output of said first adder being output as an in-phase component corrected for quadrature errors.

6. A demodulator comprising:

(a) a quadrature detecting unit fed with and quadrature-detecting a quadrature modulated signal to output an in-phase component and a quadrature component;

(b) a quadrature controller fed with the in-phase component and the quadrature component output from said quadrature detecting unit, said quadrature controller correcting the quadrature error between the in-phase component and the quadrature component based on an input quadrature error signal, and outputting the resulting signal;

(c) an automatic gain controller fed with the in-phase component and the quadrature component output from said quadrature controller and outputting signals corrected for amplitude errors based on the input amplitude error signal as the in-phase component and the quadrature component of a demodulated signal;

(d) an error detection unit detecting, from the in-phase component and the quadrature component of the demodulated signal output from said automatic gain controller, an in-phase component of said error signal and a polarity signal of the in-phase component of the demodulated signal, and a quadrature component of the error signal and a polarity signal of the quadrature component of said demodulated signal;

(e) an amplitude error detection unit generating an in-phase component and a quadrature component of an amplitude error signal based on the in-phase component of said error signal output from said error detection unit and the polarity signal of the in-phase component of the demodulated signal, and on the quadrature component of the error signal and the polarity signal of the quadrature component of said demodulated signal, to output the generated in-phase and quadrature components of said amplitude error signal to said automatic gain controller; and (f) a quadrature error detection unit generating a quadrature error signal based on the in-phase component of the error signal and the polarity signal of the in-phase component of said demodulated signal, both output from said error detection unit, and on the in-phase component of said error signal and the polarity signal of the quadrature component of said demodulated signal to feed the generated quadrature error signal to said quadrature controller, wherein said quadrature error detection unit comprises:

a first multiplier multiplying the in-phase component of the error signal (Ei) output from said quadrature detecting unit with the polarity signal (Dq) of the quadrature component of said demodulated signal;

a second multiplier multiplying the quadrature component of the error signal (Eq) output from said quadrature detecting unit with the polarity signal (Di) of the in-phase component of said demodulated signal;

and an adder summing outputs of said first and second multipliers;

an output signal of said adder being output as said quadrature error signal (Qd).

7. A demodulator comprising:

(a) an quadrature detecting unit fed with a quadrature modulated signal as an input signal to quadrature-detect the input signal to output in-phase and quadrature components of a regular amplitude;

(b) a quadrature controller fed with the in-phase and quadrature components output from the quadrature detection unit to correct the quadrature error between phases of the in-phase and quadrature components, based a quadrature error signal;

(c) an automatic gain controller fed with the in-phase and quadrature components output from said quadrature controller to output signals corrected for respective amplitude errors as in-phase and quadrature components of a demodulated signal;

(d) an error detection unit detecting an in-phase component of an error signal and a polarity signal of the in-phase component of the demodulated signal, and a quadrature component of the error signal and a polarity signal of the quadrature component of the demodulated signal, from the in-phase and quadrature components of the demodulated signal output from the automatic gain controller; and (e) a quadrature error detection unit generating a quadrature error signal based on the in-phase component of the error signal and the polarity signal of the in-phase component of the demodulated signal and the quadrature component of the error signal and a polarity signal of the quadrature component of the demodulated signal, all output from said error detection unit, to feed the generated quadrature error signal to said quadrature controller, wherein said quadrature error detection unit comprises:

a first multiplier multiplying the in-phase component of the error signal (Ei) output from said quadrature detecting unit with the polarity signal (Dq) of the quadrature component of said demodulated signal;

a third multiplier multiplying the quadrature component of the error signal (Eq) output from said quadrature detecting unit with the polarity signal (Di) of the in-phase component of said demodulated signal;

and an adder summing outputs of said first and second multipliers, an output signal of said adder being output as said quadrature error signal (Qd).

8. The demodulator as defined in claim 2 wherein said automatic gain controller comprises:

a first low-pass filter smoothing out and outputting the in-phase component of the amplitude error signal output from said amplitude error detection unit;

a second low-pass filter smoothing out and outputting the quadrature component of the amplitude error signal output from said amplitude error detection unit;

a first multiplier multiplying the in-phase component output from said quadrature controller as an input signal with an in-phase component of the amplitude error signal smoothed out by said first low-pass filter, said first multiplier outputting the result of multiplication as the in-phase component of the demodulated signal; and a second multiplier multiplying the quadrature component output from said quadrature controller as an input signal with a quadrature component of the amplitude error signal smoothed out by said second low-pass filter, said second multiplier outputting the result of multiplication as the quadrature component of the demodulated signal.

9. A demodulator comprising:

(a) an quadrature detecting unit fed with a quadrature modulated signal as an input signal to quadrature-detect the input signal to output in-phase and quadrature components of a regular amplitude;

(b) a quadrature controller fed with the in-phase and quadrature components output from the quadrature detection unit to correct the quadrature error between phases of the in-phase and quadrature components, based a quadrature error signal;

(c) an automatic gain controller fed with the in-phase and quadrature components output from said quadrature controller to output signals corrected for respective amplitude errors as in-phase and quadrature components of a demodulated signal;

(d) an error detection unit detecting an in-phase component of an error signal and a polarity signal of the in-phase component of the demodulated signal, and a quadrature component of the error signal and a polarity signal of the quadrature component of the demodulated signal, from the in-phase and quadrature components of the demodulated signal output from the automatic gain controller; and (e) a quadrature error detection unit generating a quadrature error signal based on the in-phase component of the error signal and the polarity signal of the in-phase component of the demodulated signal, and the quadrature component of the error signal and a polarity signal of the quadrature component of the demodulated signal, all output from said error detection unit to feed the generated quadrature error signal to said quadrature controller, wherein said automatic gain controller comprises:

a first absolute value computing circuit determining an absolute value of the in-phase component output from said quadrature controller;

a second absolute value computing circuit determining an absolute value of the quadrature component output from said quadrature controller;

a third adder adding together outputs from the first and second absolute value computing circuits;

a fourth low pass filter smoothing out an output of the third adder;

a sixth multiplier multiplying an in-phase component output from said quadrature controller with an output of the fourth low pass filter; and wherein the quadrature component output from the quadrature controller is directly output as the quadrature component, and an output of the sixth multiplier is output as the in-phase component of the demodulated signal.

* * * * *